(12) United States Patent
Byington

(10) Patent No.: X1865
(45) Date of Patent: Jan. 12, 1813

(54) FORK, PITCH

(76) Inventor: Jared Byington

Jared Byington
Letters Patent

The Schedule referred to in these Letters Patent & making part of the same containing a description in the words of the said Jared Byington himself of his improvement in manufacturing Pitch forks The characteristic principle in what is usually called by Mechanics a spring temper or that temper given to steel proper for springs is some locks, steel traps &c applied to Pitchforks, which may be done in the following manner (viz)

The forks being made with two or more prongs each of which may be made round, four or eight square or any shape that may suit the workmen & steel or such other substances as will admit of a spring temper —

It is to be tempered in the following manner, the fork is to be heated red hot or such heat as is proper for the temper of the steel & plunge it into water or some other liquid proper to harden it & if need be reduce the temper by heating the fork until it is brought to a proper temper for springs — then if the workman chooses some kind of oil or grease with about one tenth part of the spirits of turpentine mixed together may be applied to the fork while hot to toughen the steel.

Witnesses
Daniel Marsh
Wm B. Marsh

Jared Byington

Patent Office Dec 17/31
Recd & recorded anew in this office
Thos Ewbank Commr of Patents
from a certified copy of the original Patent.